April 24, 1951     I. HARTER     2,550,641
METHOD OF AND APPARATUS FOR WELDING
Filed Aug. 25, 1947
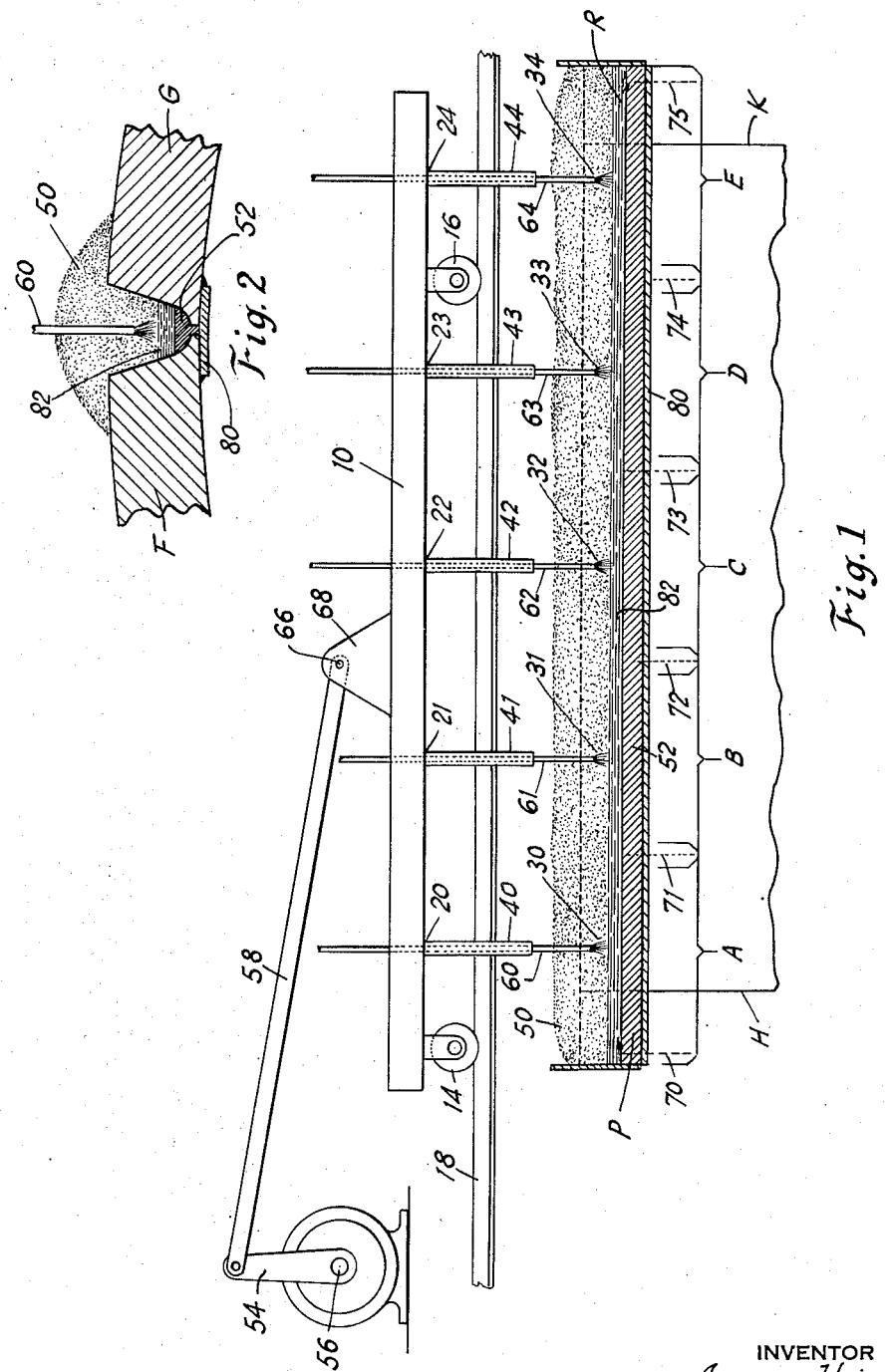
INVENTOR
*Isaac Harter*
BY
*M Holbrook* ATTORNEY Patented Apr. 24, 1951

2,550,641

UNITED STATES PATENT OFFICE 2,550,641

METHOD OF AND APPARATUS FOR WELDING

Isaac Harter, Beaver, Pa., assignor to The Babcock & Wilcox Company, Rockleigh, N. J., a corporation of New Jersey Application August 25, 1947, Serial No. 770,467

3 Claims. (Cl. 219—10)

This invention relates to electric welding, and more particularly to improvements in a method and an apparatus for effecting submerged arc welding.

Some users of submerged arc welding of long seams with a single bare electrode below a protective layer of granulated flux have limited the process to pressure vessel wall thicknesses up to 1¾", as it is believed that welding of heavier seams may result in the formation of small shrinkage cracks in the weld which cannot be detected by customary X-ray examination procedure. Evidence indicates that, after a certain amount of weld metal is deposited, the new metal then has to solidify in a kind of C-clamp of extreme rigidity. Consequently, all of the shrinkage has to come from the new metal, and this shrinkage being more than the new metal can provide, cracking occurs. Such cracking has been avoided in automatic multi-pass welding by depositing a large number of successive weld metal layers each of extremely small cross section. However, this method involves the payment of a heavy price on account of the large number of passes required to fill up the weld groove and also on account of the time consuming chipping operations necessary for the removal of the solidified flux before each bead is deposited.

A major part of the heavy welding effected by the pertinent method occurs in pressure vessels or in other structures the dimensions of which are large. Hence, such structures, while heavy in section, are not inherently very rigid. For example, a 12 inch long annular section of a pressure vessel 5 feet in diameter and of a 4 inch wall thickness, lying on its side, would easily show a change in vertical diameter on an Ames gauge as a result of a person standing on the section.

Such a ring section, before it is welded, would yield very easily to diametral pressure along a diameter 90° from the opening (the weld seam opening). In the pracitce of the present invention, the entire weld groove is filled up with fused metal at such a rapid rate that none of the fused metal is cooled below the stress relieving temperature, before the weld is completed. Under these conditions, shrinkage stresses transverse to the entire radial plane of the weld are almost uniform and are easily satisfied by the diametral contraction of the ring.

As an example of apparatus for effecting the method of my invention, a plurality of submerged arc welding heads, each feeding its rod and flux to its arc, may be fixed in spaced positions along an electrode holder extending longitudinally of the seam to be welded. For example, the electrodes of the submerged arc head may be spaced as little as 12 inches apart for the full length of the seam. The electrode holder is mounted for reciprocating movement along the seam and it is reciprocated through a path of movement the length of which is of the order of the spacing of the electrodes.

The above and other features of the invention will become apparent from the following description when read in connection with the accompanying drawings, in which, Fig. 1 is a diagrammatic view in the nature of a longitudinal vertical section, showing the apparatus by which the multiple electrodes are simultaneously reciprocated in the plane of the weld seam; and Fig. 2 is a detail transverse section of the weld seam, showing one of the electrodes in position.

The mechanism indicated in Fig. 1 includes an electrode holder 10 mounted for reciprocating movement relative to the weld seam. It is shown as supported by rollers such as 14 and 16 which may move along the fixed track 18 parallel to the weld seam.

At spaced positions such as 20 to 24, inclusive, along the electrode holder 10, there may be mounted submerged arc welding heads each continuously feeding a bare metal electrode to one of the arcs 30—34 at such rates that the arcs are maintained at proper welding lengths. These heads may also maintain the zones of the arcs submerged beneath a body of granular flux a part of which is fused by the action of the arcs.

It should also be understood that the disclosure of Fig. 1 is diagrammatic in its nature, indicating a plurality of electrode guides 40—44 secured to the electrode holder 10 (or submerged arc head holder) at the uniformly spaced positions 20—24. Fig. 1 also diagrammatically indicates at 50 a body of flux submerging the arcs along the seam. The body of weld metal 52, is indicated as having been deposited at the bottom of the groove.

The electrode holder and the metal depositing electric arcs are caused to be moved back and forth along the weld seam by means of motion transmitting mechanism including a crank arm 54, fixed to a rotating shaft 56, the center to center radius of the crank arm being of the order of the spacing of the electrodes 60—65 (and preferably greater than this spacing). The crank arm 54 is pivotally connected at its outer end to a pitman, or connecting rod 58, the latter being pivotally connected at its other end at 66 to a plate 68 fixed to the electrode holder 10.

In the operation of the invention, the electrode 60, for example, is reciprocated in the zone A (between positions 70 and 71), as it continuously deposits a layer of molten metal from the fused electrode beneath the body of flux. The rate of deposition of the metal in this zone is such that the entire weld groove is filled with fused metal before the temperature of any of that metal falls below the stress relieving temperature. Simultaneously, metal is similarly deposited throughout the length of the seam, in similar zones such as indicated at B, C, D, and E. These successive zones of metal deposition may overlap. Thus, if the position 71 indicates a point midway between the electrodes 60 and 61, the zone A deposition will extend to the right of position 71, and the metal deposition in zone B will extend to the left of that position, similar overlapping taking place at positions 72—75. With the above indicated method of welding, shrinkage stresses transverse to the radial plane of the weld are substantially uniform, and are easily satisfied by the diametral contraction of the welded body.

The actual pressure vessel shell, or shell section, being welded, extends from H to K, the end weld groove sections P and R extending from H to the position 70 and from K to the position 75 being formed by test sections fixed to the pressure vessel shell section before the welding is begun.

The illustrative method is particularly advantageous in the manufacture of heavy walled pressure vessels for high pressure uses. The shells of such vessels are generally of heavy plate, bent to cylindrical shape, leaving the unsecured sides spaced to form a weld groove. When the seam weld along this groove is completed by filling the groove with weld metal before any of the weld metal has cooled below the stress relieving temperature, the entire weld further cools as a body, integral with the remainder of the shell. Thus, the contraction of the metal results in contraction of the shell, and does not produce cracks in the weld itself.

In Fig. 2 of the drawings the groove forming portions of the plate structure to be welded are indicated at F and G. They are held in groove forming relationship, and the bottom of the weld groove is formed by the backing strip 80. Fig. 2 also shows the weld at an intermediate stage with molten weld metal 82 between the solidified weld metal 52, and the weldrod 60.

What is claimed is:

1. In a method of electric arc fusion welding, forming a groove along the seam to be welded, simultaneously maintaining a plurality of metal fusing electric arcs uniformly distributed throughout the entire length of the seam, and continuously supplying weld metal to each of the arcs throughout the welding action while reciprocating the arcs longitudinally of the seam with the amplitude of reciprocation being of the order of the longitudinal spacing of the arcs, to fill the entire groove uniformly with weld metal at such a rate that the entire body of deposited metal will cool substantially as a unit.

2. In arc welding apparatus, an elongated electrode holder extending parallel to and substantially the full length of the seam to be welded, means supporting said holder for reciprocation along the seam, a plurality of electrode guides fixed to said holder at uniformly spaced positions longitudinally thereof and of the seam, an electrode normally advanced through each guide, and reciprocating motion transmitting mechanism connected to said holder and adapted to give said electrodes and electric arcs at the ends thereof simultaneously reciprocating movements along the seam, the amplitude of said reciprocating movements being of the order of the spacing of the electrode guides.

3. In a method of submerged arc seam welding, the steps of forming a groove along the seam to be welded, depositing a body of flux in said groove, drawing a plurality of flux and metallic electrode fusing arcs beneath said flux and at uniformly spaced positions along the entire length of the seam, continuously supplying weld metal to all of said arcs, causing the arcs to be simultaneously moved back and forth in limited longitudinal zones having a length of the order of the arc spacing, and correlating the movement of said arcs with the cooling of the previously deposited weld metal layers and thereby causing each succeeding weld layer to be deposited before the immediately preceding weld metal layer has its temperature cooled below the stress relieving temperature range.

ISAAC HARTER.

REFERENCES CITED

The following references are of record in the file of this patent:

UNITED STATES PATENTS

| Number | Name | Date |
|---|---|---|
| 1,298,590 | Smith | Mar. 25, 1919 |
| 1,544,044 | Smith | June 30, 1925 |
| 1,795,332 | Deppeler | Mar. 10, 1931 |
| 2,043,960 | Jones et al. | June 9, 1936 |
| 2,175,606 | Kinkead | Oct. 10, 1939 |
| 2,184,534 | Smith et al. | Dec. 26, 1939 |
| 2,191,482 | Hopkins | Feb. 27, 1940 |
| 2,344,534 | Bucknam et al. | Mar. 21, 1944 |
| 2,437,782 | Hopkins | Mar. 16, 1948 |

OTHER REFERENCES

"Welding Journal," February 1941, pages 105–107.